(12) United States Patent
Welker (10) Patent No.: US 8,477,560 B2
(45) Date of Patent: Jul. 2, 2013

(54) DETERMINING A POSITION OF AN OBJECT OF A POSITIONING NETWORK ASSOCIATED WITH A MARINE SURVEY ARRANGEMENT

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 713 days.

(21) Appl. No.: 12/559,031

(22) Filed: Sep. 14, 2009

(65) Prior Publication Data

US 2010/0074050 A1    Mar. 25, 2010

Related U.S. Application Data

(60) Provisional application No. 61/098,610, filed on Sep. 19, 2008.

(51) Int. Cl.
*G01V 1/38* (2006.01)
(52) U.S. Cl.
USPC .............................. 367/16; 367/19
(58) Field of Classification Search
USPC .......................... 367/15–16, 19, 128; 356/614
See application file for complete search history.

(56) References Cited

U.S. PATENT DOCUMENTS

| | | | |
|---|---|---|---|
| 5,117,400 A | | 5/1992 | Penn et al. |
| 5,214,517 A | * | 5/1993 | Sullivan et al. ............... 358/3.19 |
| 5,214,617 A | * | 5/1993 | Rouquette ..................... 367/124 |
| 5,596,494 A | * | 1/1997 | Kuo ................................. 702/2 |
| 7,139,082 B2 | * | 11/2006 | Desharnais et al. .......... 356/601 |
| 7,424,133 B2 | * | 9/2008 | Schultz et al. ................ 382/106 |
| 7,519,502 B1 | * | 4/2009 | Carneal et al. ................ 702/167 |
| 7,679,530 B2 | * | 3/2010 | Waquet ......................... 340/984 |
| 2004/0070770 A1 | | 4/2004 | Desharnais et al. | 
| 2008/0008031 A1 | | 1/2008 | Vigen et al. |

FOREIGN PATENT DOCUMENTS

| | | | |
|---|---|---|---|
| GB | 2414804 A | | 12/2005 |
| WO | WO 2005096018 A1 | * | 10/2005 |
| WO | 2008005707 A1 | | 1/2008 |

OTHER PUBLICATIONS

Loweth, "Manual of Offshore Surveying for Geoscientists and Engineers", Chapman and Hall 1997, pp. 158-164.*
Photogrammetry, Wikipedia Encyclopidia, Aug. 5, 2009.
Extended Search Report of European Application Serial No. 09170650.7 dated Nov. 21, 2011.

* cited by examiner

*Primary Examiner* — Isam Alsomiri
*Assistant Examiner* — Krystine Breier (57) ABSTRACT

To determine a position of an object in a positioning network associated with a marine survey arrangement, images of targets on the object in the positioning network are captured with a plurality of cameras. Based on known positions of the plurality of cameras and known separation between the targets, positions of the targets are computed by processing the images. A position of the object is derived based on the positions of the targets.

22 Claims, 6 Drawing Sheets

DETERMINING A POSITION OF AN OBJECT OF A POSITIONING NETWORK ASSOCIATED WITH A MARINE SURVEY ARRANGEMENT

CROSS REFERENCE TO RELATED APPLICATION

This claims the benefit under 35 U.S.C. §119(e) of Provisional Application Ser. No. 61/098,610, entitled "Photogrammetric Float Positioning," filed Sep. 19, 2008, which is hereby incorporated by reference.

TECHNICAL FIELD

The invention relates generally to determining positions of objects of a positioning network associated with a marine survey arrangement.

BACKGROUND

Surveying is used for identifying subterranean elements, such as hydrocarbon reservoirs, freshwater aquifers, gas injection zones, and so forth. Surveying can include seismic surveying or electromagnetic (EM) surveying. In seismic surveying, seismic sources are placed in various locations above an earth surface or sea floor, with the seismic sources activated to generate seismic waves directed into the subterranean structure.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

EM surveying involves deployment of one or more EM sources that produce EM waves that are propagated into the subterranean structure. EM signals are affected by elements in the subterranean structure, and the affected signals are detected by EM receivers, which are then processed to yield information about the content and characteristic of the subterranean structure.

Surveying of a subterranean structure can be performed in a marine environment, in which a marine vessel tows survey sources (e.g., EM sources or seismic sources) for generating survey signals to perform the survey. Survey receivers are used for measuring responses of the subterranean structure to the survey signals. The survey receivers may be dropped to the water bottom surface (e.g., sea floor), or the survey receivers may be part of a streamer towed by the marine vessel.

For accurate analysis of results acquired by the survey system, it is desired to know actual positions of the elements of the survey system, including survey sources and survey receivers. To determine positions of the elements of the survey system, positioning networks can be deployed. A positioning network can be implemented with an acoustic positioning system, for example, which includes acoustic transmitters and receivers that send acoustic signals to allow for acoustic positioning of target elements of the survey system.

Typically, an acoustic positioning network is outfitted with a front buoy (float) and a rear buoy (float) that each includes a GPS (global positioning system) receiver. Positioning equipment is provided between the front and rear buoys. The GPS receivers on the front and rear buoys allow absolute coordinates of the front and rear buoys to be known, so that the positioning network can accurately determine positions of components of survey equipment.

However, buoys with GPS receivers are difficult to deploy, retrieve, and maintain. In particular, such buoys hinder streamer maintenance and stacking operations. Also, the buoys are subject to various failures, such as failures of data communication, power loss failures, and so forth.

SUMMARY

In general, to determine a position of an object in a positioning network associated with a marine survey arrangement, images of targets on the object in the positioning network are captured with a plurality of cameras. Based on known positions of the plurality of cameras and known separation between the targets, positions of the targets are computed by processing the images. A position of the object is derived based on the positions of the targets.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1A:
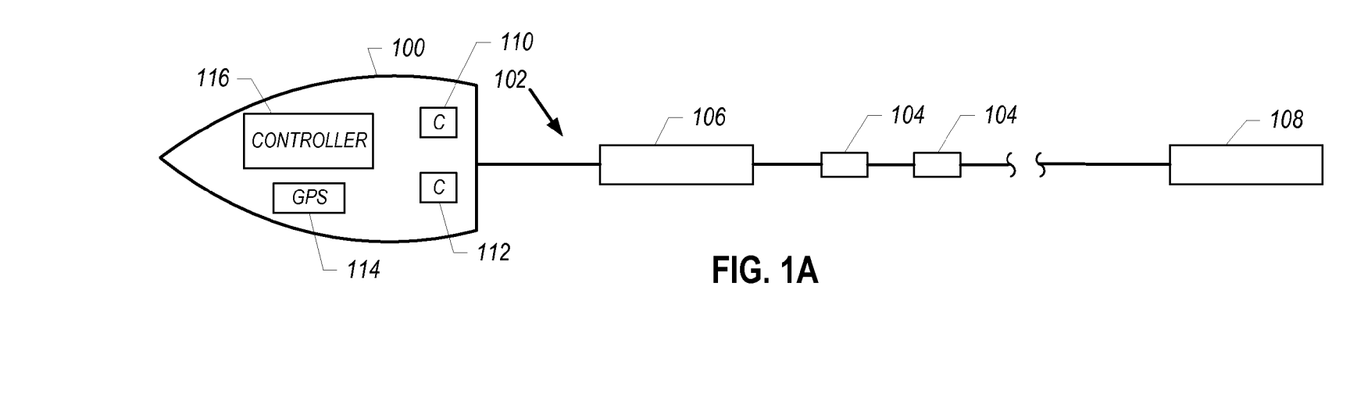
FIGS. 1A-1B illustrate an exemplary marine survey arrangement in which an embodiment of determining positions of objects of a positioning network can be incorporated.
Figure 1B:
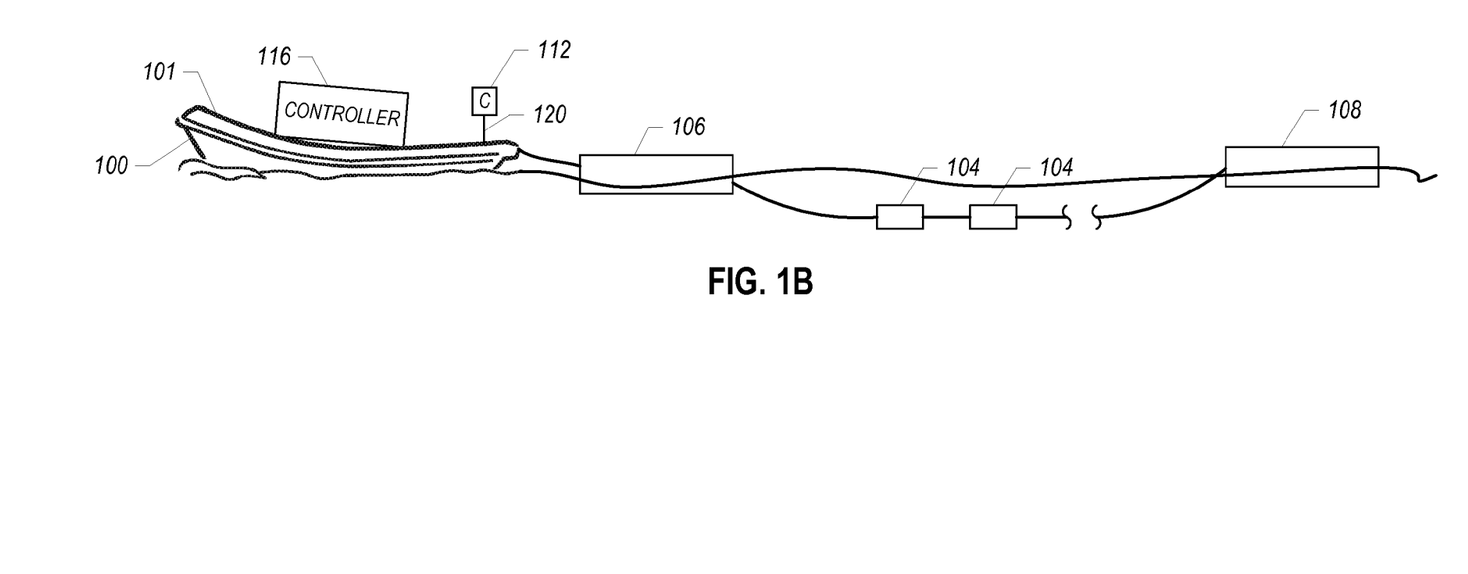

FIGS. 1A and 1B illustrate an exemplary arrangement for performing a marine survey operation. The marine survey operation can be a seismic survey operation or an electromagnetic (EM) survey operation. A marine vessel 100 is used to tow a survey spread, which includes a streamer 102 that has positioning equipment and survey equipment. Although just one streamer 102 is shown in FIGS. 1A and 1B, it is noted that additional streamers can be towed by the marine vessel 100 in alternative implementations. Also, although not shown, the marine vessel 100 can also tow a cable that carries a survey source (e.g., seismic source or EM source).

The positioning equipment in the streamer 102 includes positioning equipment assemblies 104, which can be provided between a front buoy assembly 106 and a rear buoy assembly 108. The buoy assemblies can also be referred to as float assemblies. The streamer 102 also includes survey equipment in the form of survey receivers (e.g., seismic receivers such as geophones, hydrophones, or EM receivers), which are not shown in FIGS. 1A and 1B. The positioning equipment assemblies 104 and the front and rear buoy assemblies can form a positioning network. The positioning network is used to determine positions of survey equipment such that the determined positions can be recorded and used later when processing collected survey data.

Conventionally, global positioning system (GPS) receivers are positioned on the front and rear buoy assemblies 106 and 108 to allow the positions of the front and rear assemblies to be determined. However, buoy assemblies with GPS receivers are difficult to deploy, retrieve, and maintain. In particular, such buoy assemblies hinder streamer maintenance and stacking operations.

In accordance with some embodiments, instead of using GPS receivers on the front and rear buoy assemblies 106 and 108, cameras (still image cameras or video image cameras) 110 and 112 can be used instead for determining positions of the front and rear buoy assemblies 106 and 108. The marine vessel 100 has at least one GPS receiver 114 to allow the position of the marine vessel 100 to be known. Based on the GPS-derived marine vessel position and the known positions of the cameras 110 and 112 on board the marine vessel 100, the absolute positions of the cameras 110 and 112 can be accurately derived. The relative positions of the cameras 110 and 112 to the front and rear buoy assemblies 106 and 108 can then be determined, from which the absolute positions of the front and rear buoy assemblies can be determined since the positions of the cameras 110 and 112 are known.

Although just two cameras 110 and 112 are shown in FIG. 1A, it is noted that more camera(s) can be used in alternative implementations. A minimum of 3 cameras are needed for 3D determinations unless the vertical difference between the cameras and the targets are known, allowing a minimum amount of information (i.e., 2 cameras) to be projected into the plane.

The marine vessel 100 also includes a controller 116 that is able to perform processing of still images or video images captured by the cameras 110 and 112 to determine positions of the front and rear buoy assemblies 106 and 108. The controller 116 can be implemented with a computer, for example. The determined positions of the front and rear buoy assemblies 106 and 108 are absolute positions that are based on the relative distances of the front and rear assemblies 106 and 108 to the cameras 110 and 112, and the known positions of the cameras 110 and 112 as derived from the GPS information.

As further shown in FIG. 1B, each camera (112 shown in the view of FIG. 1B) is mounted on a vertical elongated support 120 that raises the camera 112 some distance above a surface deck 101 of the marine vessel 100. Each camera 110, 112 is raised a distance above the surface deck 101 of the marine vessel 100 to allow the camera 110, 112 to better capture images of the front and rear buoy assemblies 106 and 108. The elongated support 120 extends from the surface deck 101 in a generally vertical direction that is generally perpendicular to the surface deck 101.

By determining the absolute positions of the front and rear buoy assemblies 106 and 108, the positions of the positing equipment assemblies 104 can also be determined, since they are at a known separation away from respective buoy assemblies 106, 108.

Each positioning equipment assembly 104 includes components to allow for positions of elements of a survey spread to be determined. For example, the positioning equipment assembly 104 can be part of an acoustic positioning network. In this case, the positioning equipment assembly 104 includes an acoustic pinger to transmit acoustic signals that are reflected from elements of the survey spread. The reflected acoustic signals are detected by acoustic sensors in the positioning equipment assembly 104.

Figure 2:
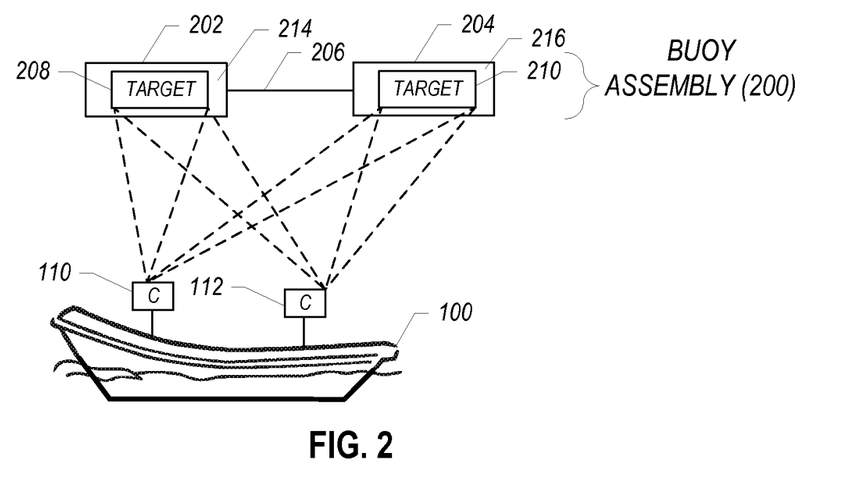
FIG. 2 illustrates another exemplary marine survey arrangement in which an embodiment of determining positions of objects of a positioning network can be incorporated.

As shown in FIG. 2, which illustrates a front perspective view of the marine vessel 100, a buoy assembly 200 has two buoy components 202 and 204 that are interconnected by a rigid connector 206. The buoy assembly 200 can be either the front buoy assembly 106 or the rear buoy assembly 108 shown in FIGS. 1A and 1B.

The buoy components 202 and 204 have respective targets 208 and 210 arranged on respective surfaces 214 and 216 of the buoy components 202 and 204 facing the cameras 110 and 112. The targets 208 and 210 can have any type of pattern that is distinct from the general background of the surfaces 214 and 216 of the buoy components 202 and 204 facing the cameras 110 and 112. As examples, the pattern can be a predefined color, a predefined shape, a predefined arrangement of visual elements, a light reflector, and so forth. Since seismic operations are ideally conducted 24 hours a day, light emitting targets can be beneficial.

In an alternative implementation, instead of providing two buoy components, a single buoy component is provided in the buoy assembly 200, where the single buoy component is of sufficient width such that two targets 208 and 210 can be sufficiently spaced apart to allow image processing of images recorded by the cameras 110, 112 to determine relative positions of the targets 208 and 210.

The rigid connector 206 between the buoy components 108 and 210 allows a known, fixed distance to be defined between the targets 208 and 210. The known distance between the targets 208 and 210 provides the scale in the images recorded by the cameras 110, 112, such that image processing performed at the controller 116 can perform accurate positioning of the targets 208 and 210.

The technique used for determining positions (three-dimensional coordinates) of the targets 208 and 210 of the buoy assembly 200 is a photogrammetric technique. More specifically, the photogrammetric technique is a stereo photogrammetric technique. With stereo photogrammetry, the coordinates are determined by measurements made in two or more photographic (or video) images taken from different positions (in FIG. 2 the positions of the two cameras 110 and 112). A line of sight can be determined from each camera 110, 112 to a corresponding target. The intersection of 3 rays from the different cameras determines the three-dimensional location of the target, based on triangulation. A minimum of 3 cameras are needed for 3D determinations unless the vertical difference is known allowing a minimum amount of information (i.e., 2 cameras) to be projected into the plane. The known distance between the targets 208 and 210 can be used as a scale to further help determine the correct coordinate of each target.

Although FIGS. 1A, 1B, and 2 show cameras 110 and 112 mounted on the marine vessel 100, note that the cameras 110 and 112 can be mounted in other locations in different embodiments. For example, one or more of the cameras can be mounted on one or more floats that are towed by the marine vessel 100. As yet another alternative, one or more of the cameras can be mounted to an aircraft that is in a line of sight of the buoy assemblies 106 and 108 that are to be positioned. Alternatively, the cameras can be mounted on kites or balloons. If mounted on kites or balloons, the kites or balloons can be tethered to the marine vessel 100 shown in FIGS. 1A, 1B, and 2. The only requirement for the cameras is that their coordinates be known in order to relate them to the photogrammetric target. This principle enables photogrammetric networks that can propagate over large distances in short steps, relating nearby targets to points whose relation are known ultimately through relative determination.

Figure 3:
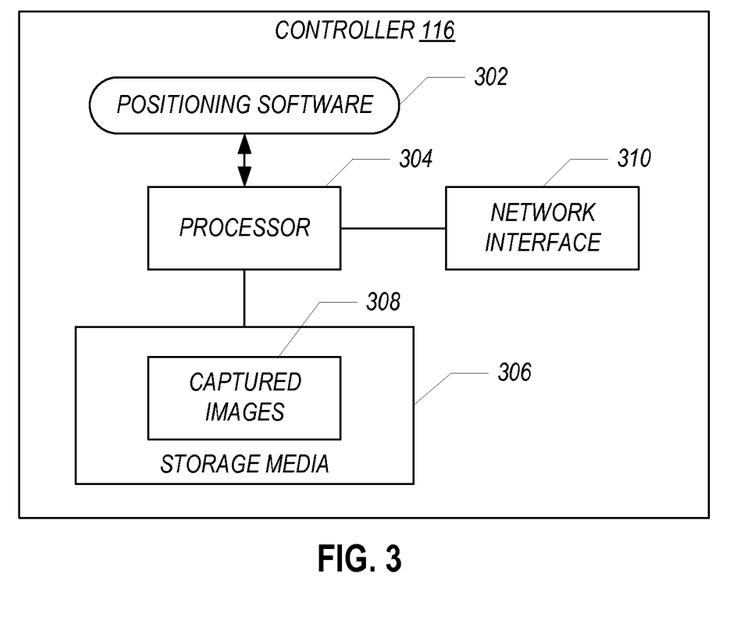
FIG. 3 is a block diagram of a controller that incorporates an embodiment of the invention.

FIG. 3 illustrates an exemplary controller 116 that includes positioning software 302 executable on a processor 304. The processor 304 is connected to storage media 306, which can be implemented with one or more disk-based storage devices and/or one or more integrated circuit or semiconductor storage devices.

The storage media 306 is used to store images 308 captured by the cameras shown in FIGS. 1A, 1B, and 2, for example. The images captured by the cameras are communicated from the cameras to the controller 116. The images are passed through a network interface 310 in the controller 116 for storage in the storage media 306.

Figure 4:
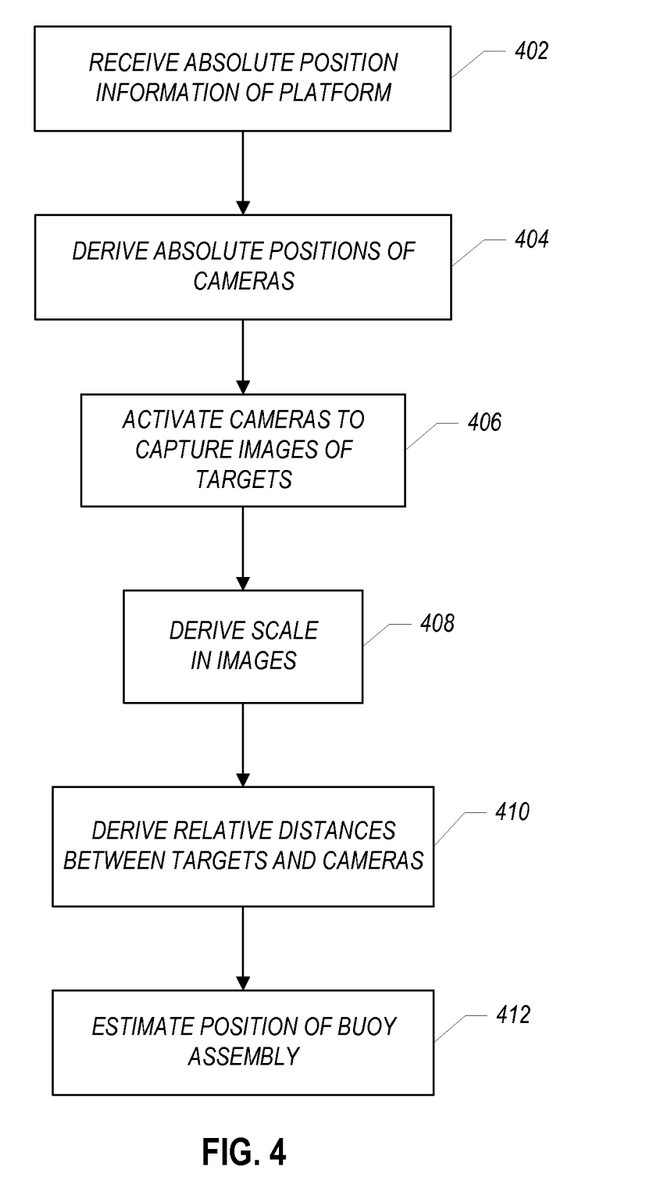
FIG. 4 is a flow diagram of a process of accurately determining positions of objects of a positioning network associated with a marine survey arrangement, in accordance with an embodiment.

FIG. 4 is a flow diagram of a process performed by the controller 116 (and more specifically, the positioning software 302) according to an embodiment. The controller 116 receives (at 402) GPS-based position information (in the form of three-dimensional coordinates, for example), such as GPS-based position information acquired by the GPS receiver 114 of a marine vessel or other type of platform. The GPS-based position information provides an absolute position of a platform on which cameras 110 and 112 are located. In an alternative implementation, instead of using GPS-based position information, other forms of absolute information relating to the platform on which the cameras 110 and 112 are mounted can be received.

Using the received known information of a point on the platform associated with the GPS receiver 114, the absolute positions of the cameras 110 and 112 can be derived (at 404). The relative positions of the cameras 110 and 112 to the point associated with the GPS receiver 114 is known and can be accessed for use in computing the positions of the cameras 110 and 112.

Next, the cameras 110 and 112 are activated (at 406) to capture images, such as the images of the targets 208 and 210 in the buoy assembly 200. A scale is derived (at 408) based on a known distance in the acquired images (such as known distance between targets 208 and 210 on buoy components 202 and 204 that are interconnected by the rigid member 206. Once the scale is derived, then position processing as discussed above is applied (at 410) to derive the relative distances of the targets 208 and 210 to the cameras 110 and 112 such that the positions of the targets 208 and 210 can be computed. This allows the position of the buoy assembly 200 to be estimated (at 412), such as by taking the average of the computed positions of the targets 208 and 210.

The foregoing procedure can be repeated for each element in the streamer 102 for which positioning is to be performed. Each such element (such as positioning equipment assemblies 104 and buoy assemblies 106 and 108) is associated with targets that can be captured by the cameras 110 and 112.

In addition to using images acquired by the cameras 110 and 112 to determine positions of objects of a positioning network such as the buoy assemblies 106 and 108 and positioning equipment assemblies of FIGS. 1A and 1B, the cameras 110 and 112 in an alternative embodiment can be used to determine the sea surface shape. During rough sea conditions with large waves, the buoy assemblies 106 and 108 may experience large variations in height. The cameras 110 and 112 shown in FIGS. 1A and 1B can be used to determine the heights of the targets on the buoy assemblies. By continually capturing the images and processing such images to record heights of the buoy assemblies over time and space, the sea surface shape can be determined at different times.

In addition to determining positions of elements of the streamer 102, it is also possible to determine other characteristics of such elements based on processing images acquired by the cameras 110 and 112. Such characteristics can include a size and/or orientation of the element. Information regarding orientations associated with elements can also be provided by accelerometers or compasses on the elements.

Figure 5:
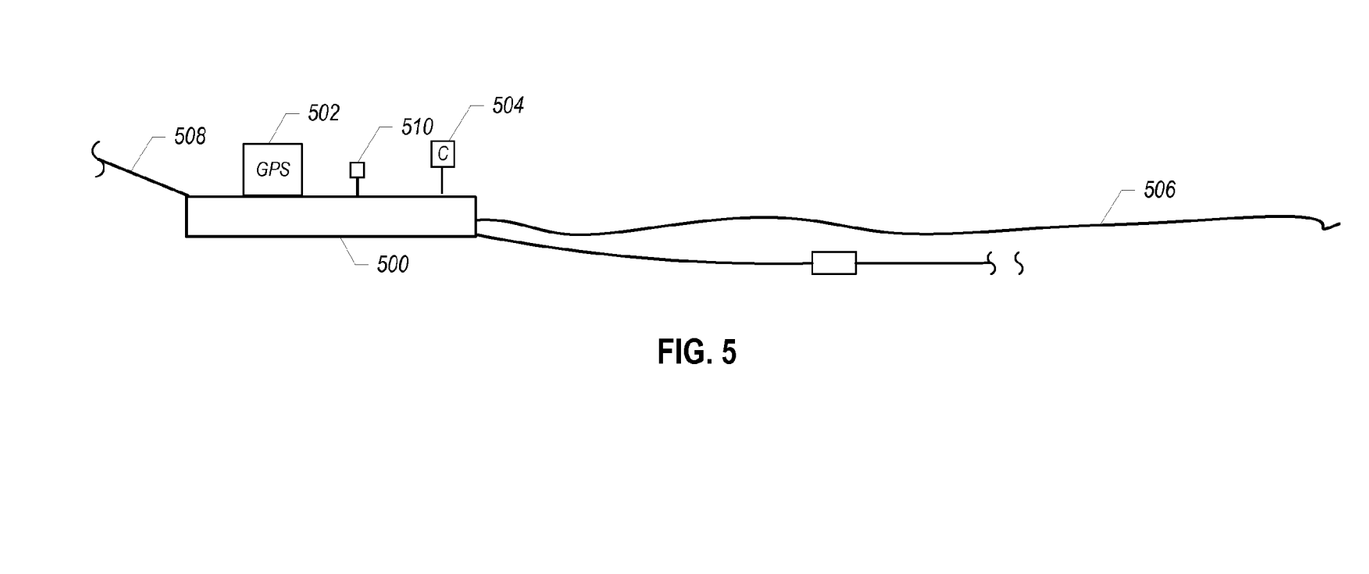
FIGS. 5 and 6 illustrate other marine survey arrangements incorporating some embodiments of determining object positions.

In an alternative embodiment, instead of using cameras 110 and 112 mounted on the marine vessel 100 to determine the sea surface shape, the cameras can instead be mounted on the buoy assemblies themselves. In such an embodiment, as shown in FIG. 5, both a GPS receiver 502 and a camera 504 can be mounted on a buoy assembly 500. The GPS receiver 502 allows the absolute coordinates of the buoy assembly 500 to be known. The camera 504 is able to capture images of the sea surface 506 to allow a determination of the shape of the sea surface 506.

Information captured by the GPS receiver 502 and the camera 504 can be communicated over a cable 508 to the marine vessel that has a controller (e.g., controller 116 in FIGS. 1A and 1B). The controller can process the information to determine positions of the buoy assembly 500 and the shape of the sea surface 506 in the proximity of the camera 504 on the buoy assembly 500. If there are multiple buoy assemblies each with a corresponding set of a GPS receiver and a camera, then the sea surface shape over a larger area of the sea surface can be determined.

In an alternative embodiment, additional sensor(s) 510 can be provided on the buoy assembly 400. The additional sensor (s) 510 can include, as examples, a compass (to measure a heading of the buoy assembly 500), an accelerometer (that is able to measure acceleration as a vector quantity), or some other sensor.

Information of such additional sensor(s) 510 can also be communicated to the controller to consider for measuring the position and orientation of the buoy assembly 500 (or other object of a survey spread).

Figure 6:
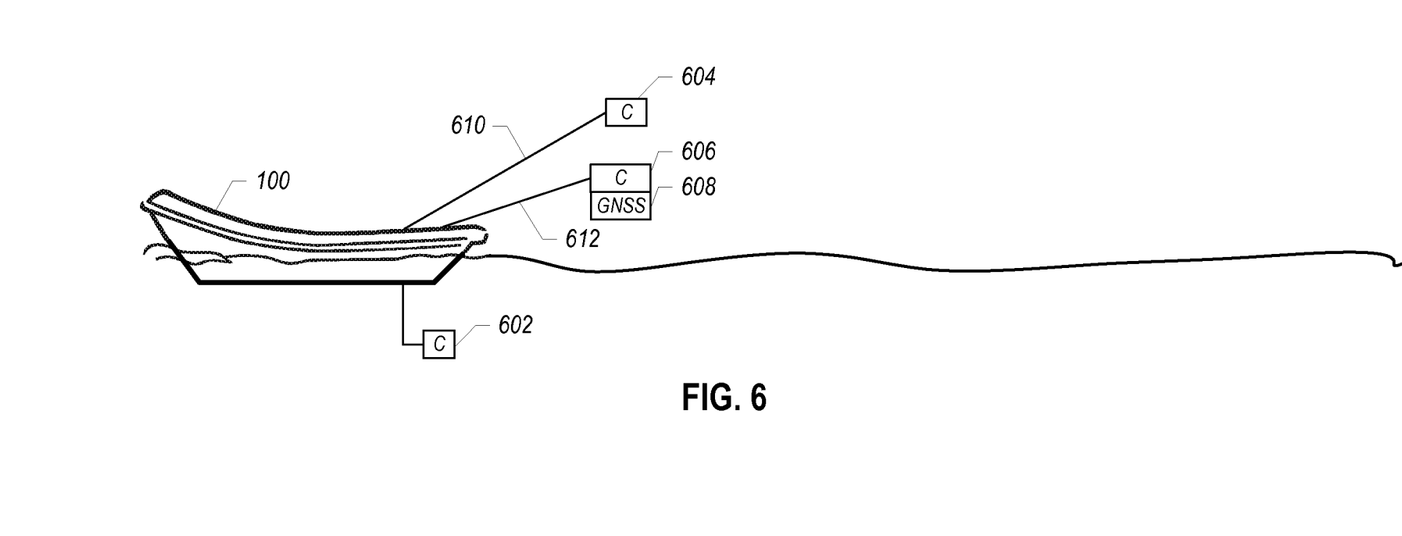

As yet another alternative, instead of mounting cameras on a platform such as the marine vessel 100, the cameras can be flown in the air or underwater. As shown in FIG. 6, an underwater camera 602 (or underwater cameras) is (are) provided underneath the marine vessel 100. Alternatively, cameras 604 and 606 can be flown in the air. For example, these cameras 604 and 606 can be attached to a parachute or parasail (not shown) to keep such cameras in the air. The cameras 604 and 606 are attached by corresponding lines 610 and 612 to the marine vessel 100.

One of the cameras 606 is shown associated with a GNSS (global navigation satellite system) receiver 608, which can provide the absolute position of the camera 606. Examples of GNSS include Russian GLONASS, European GALILEO, and Chinese COMPASS. Alternatively, other techniques can be used to determine the position of a camera in the air without a GNSS receiver, such as camera 604. The position of the camera 604 can be based on performing triangulation based on the known length of the line 610 and the angle of the line 610.

Images can be acquired by one or more of the cameras 602, 604, and 606 of targets, from which positions of the targets can be determined using techniques similar to those discussed above.

Instructions of software described above (including the positioning software 302 of FIG. 3) are loaded for execution on a processor (such as processor 304 in FIG. 3). The processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining a position of an object in a positioning network associated with a towed marine survey arrangement, comprising:
   capturing, with a plurality of cameras, images of targets on the object in the positioning network, wherein each of the cameras captures the images of the targets simultaneously, where the positioning network is for determining positions of elements in a survey spread of the marine survey arrangement; based on known positions of the plurality of cameras and known separation between the targets, computing positions of the targets by processing the images; and
   deriving the position of the object based on the positions of the targets.

2. The method of claim 1, wherein the object includes at least two components on which the targets are mounted, wherein computing the positions of the targets comprises computing positions of the at least two components.

3. The method of claim 2, wherein computing the positions of the at least two components comprises computing the positions of at least two buoy components that are part of a buoy assembly, wherein the positioning network includes the buoy assembly and a positioning equipment assembly having a signal transmitter and signal sensor, the method further comprising determining the positions of the elements in the survey spread using the signal transmitter and the signal receiver.

4. The method of claim 1, wherein deriving the position of the object comprises computing the position of the object in the positioning network that is an acoustic positioning network having an acoustic pinger and an acoustic sensor.

5. The method of claim 1, further comprising
   receiving information from a global positioning system (GPS) receiver mounted on a platform coupled to the positioning network, wherein the plurality of cameras are mounted on the platform, and wherein the known positions of the plurality of cameras are derived based on the received GPS receiver information.

6. The method of claim 1, further comprising determining a scale in the captured images based on the known separation between the targets.

7. The method of claim 6, wherein the known separation between the targets is provided by providing a rigid connection between components on which the targets are mounted.

8. The method of claim 1, further comprising repeating the capturing, computing, and deriving for determining a position of another object in the positioning network.

9. The method of claim 1, wherein capturing the images of the targets with the plurality of cameras comprises capturing the images of the targets with the plurality of cameras flown in air.

10. The method of claim 9, wherein capturing the images of the targets with the plurality of cameras flown in air comprises capturing the images of the targets with the plurality of cameras at least one of which is associated with a global navigation satellite system (GNSS) receiver.

11. The method of claim 1, wherein capturing the images of the targets with the plurality of cameras comprises capturing the images of the targets with the plurality of cameras that are positioned underwater.

12. The method of claim 1, wherein capturing the images of the targets with the plurality of cameras comprises capturing the images of the targets with the plurality of cameras mounted on one or more buoys.

13. The method of claim 1, further comprising deriving another characteristic of the object, wherein the another characteristic includes one or more of an orientation and size of the object.

14. The method of claim 1, further comprising determining a sea surface shape by processing the captured images.

15. A system comprising:
   a towed survey spread to acquire information about a subterranean structure;
   a platform;
   a positioning network configured to determine positions of elements in the survey spread;
   cameras coupled to the platform, the cameras to acquire images of targets on an object of the positioning network, wherein each of the cameras acquires the images of the targets simultaneously; and
   a controller to process the images to determine positions of the targets of the object, based on known positions of the cameras and a known separation distance between the targets.

16. The system of claim 15, further comprising a global positioning system (GPS) receiver on the platform, wherein the known positions of the cameras is based on information from the GPS receiver.

17. The system of claim 15, wherein the positioning network comprises an acoustic positioning network having an acoustic pinger and an acoustic sensor, the acoustic pinger to transmit an acoustic signal that is reflected by the elements in the survey spread, and the acoustic sensor to receive the reflected acoustic signal.

18. The system of claim 15, wherein the controller is configured to further:
   determine a scale in the images based on the known separation distance between the targets,
   wherein determining positions of the targets is based on the determined scale.

19. An article comprising at least one non-transitory computer-readable storage medium containing instructions that upon execution cause a processor to:
   receive images of targets on an object in a positioning network captured by a plurality of cameras, wherein each of the cameras captures the images of the targets simultaneously, where the positioning network is for determining positions of elements in a survey spread of a towed marine survey arrangement;
   based on known positions of the plurality of cameras and a known separation distance between the targets, compute positions of the targets by processing the images; and
   derive a position of the object based on the positions of the targets.

20. The article of claim 19, wherein the instructions upon execution cause the processor to further determine a scale between the targets in the captured images based on the known separation distance between the targets.

21. The article of claim 20, wherein the known separation distance between the targets is provided by providing a rigid connection between components on which the targets are mounted.

22. The article of claim 19, wherein the positioning network has an acoustic pinger and an acoustic sensor, the acoustic pinger to transmit an acoustic signal reflected from the elements in the survey spread, and the acoustic sensor to detect the reflected acoustic signal.

* * * * *